United States Patent
Andrade Alfonseca et al.

(10) Patent No.: US 10,771,229 B2
(45) Date of Patent: Sep. 8, 2020

(54) SYNCHRONIZING METHOD AND SYSTEM

(71) Applicant: THALES, Courbevoie (FR)

(72) Inventors: Damian Andrade Alfonseca, Chatou (FR); Tony Teixeira, Chatou (FR); Stéphane Guguen, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/556,013

(22) Filed: Aug. 29, 2019

(65) Prior Publication Data
US 2020/0076566 A1 Mar. 5, 2020

(30) Foreign Application Priority Data
Aug. 30, 2018 (FR) ..................... 18 00913

(51) Int. Cl.
*H04L 7/00* (2006.01)
*H04L 7/08* (2006.01)

(52) U.S. Cl.
CPC ............. *H04L 7/0016* (2013.01); *H04L 7/08* (2013.01)

(58) Field of Classification Search
CPC .............................. H04L 7/0016; H04L 7/08
USPC ....................................................... 375/356
See application file for complete search history.

(56) References Cited

U.S. PATENT DOCUMENTS

| | | | |
|---|---|---|---|
| 7,432,674 B2 | 10/2008 | Aoyama et al. | |
| 2008/0273124 A1* | 11/2008 | Ogino ................. | G09G 3/3406 348/790 |
| 2013/0141952 A1* | 6/2013 | Kaneko ................ | H02M 7/493 363/72 |
| 2014/0119080 A1* | 5/2014 | Sakamoto ............ | H02M 7/493 363/95 |
| 2015/0270944 A1* | 9/2015 | Tanno ................... | H04J 3/0688 370/509 |
| 2018/0130435 A1* | 5/2018 | Lee ....................... | G09G 3/3677 |

FOREIGN PATENT DOCUMENTS

DE 10 2010 064 123 B3 2/2012

* cited by examiner

*Primary Examiner* — Helene E Tayong
(74) *Attorney, Agent, or Firm* — Baker & Hostetler LLP

(57) ABSTRACT

Method and system for synchronizing a plurality of pieces of equipment, wherein it includes at least the following steps: in each equipment generating the command signal, computing a value of the difference $\Delta H$ between a reference-clock value Hm and the local clock Hi of an equipment, on detecting a phase shift $\Delta H$ between the reference-clock value and the value of a local clock, when the value of the phase shift $\Delta H$ between the local clock and the reference clock corresponds to one refresh cycle of the reference clock Hm, a corrected clock time Hic is defined by repeating a number of the clock signal of given parity if the value of the local clock is early and a corrected clock time is defined by skipping one number of the clock signal of opposite parity to the first parity if the local clock value is late, when the value of the phase shift $\Delta H$ is higher than one refresh cycle, the method resets the reference time, a corrected value of the clock in each equipment is used to emit the command signal.

9 Claims, 3 Drawing Sheets

| LEGEND (FIG. 2) | |
|---|---|
| 30 | power cables |
| 40 | rotating electric machine |
| 211 | emitter |
| 212 | receiver |
| 221 | emitter |
| 222 | receiver |
| 223 | counter |
| 224 | memory |
| 225 | processor |

SYNCHRONIZING METHOD AND SYSTEM

CROSS-REFERENCE TO RELATED APPLICATIONS

This application claims priority to foreign French patent application No. FR 1800913, filed on Aug. 30, 2018, the disclosure of which is incorporated by reference in its entirety.

FIELD OF THE INVENTION

The invention relates to a method and system for synchronizing a plurality of pieces of equipment communicating together. It is applicable to the synchronization of inverters and/or rectifiers used to produce energy (power) for a rotating electric machine.

BACKGROUND

The synchronization of a plurality of pieces of equipment possibly operating with clocks presenting different drifts in time and forming part of an assembly is a problem when it is necessary to drive these pieces of equipment simultaneously.

The synchronization of a plurality of inverters is a problem encountered when it is desired to simultaneously drive a plurality of inverters operating in parallel in order to supply a given load, a given rotating electric machine for example, with power.

In most cases, as is illustrated in FIG. 1, the synchronization of the pieces of equipment $E_1, \ldots E_N$ is achieved using a dedicated communication bus 1, via a clock signal, with the presence of one piece of equipment 2 playing the role of master for the clock. In case of loss of communication with the master piece of equipment or in case of failure of the latter, the synchronization is lost. In the case of application to delivery of power in a system in which the pieces of equipment are linked by power cables, this may lead to a loss of energy (reverse current) that will no longer be fed to the machine to be driven but to the other inverters. This circulation of energy may then lead to damage to the system.

To avoid these problems, it is known to use dedicated wired connections for the synchronization of the pieces of equipment. A "pure" clock is used to clock the pieces of equipment at the same speed.

Another solution consists in using one or more pieces of master equipment possessing a dedicated clock or a dedicated communication bus. In the case of a dedicated communication bus, the number of connections and cables is increased. This generates bulk in systems in which the space provided for the pieces of equipment is increasingly small.

Another drawback results from the fact that one or more pieces of equipment may be entirely dedicated to one function and that they cannot then play the role of master.

In the rest of the description, the expression "master piece of equipment" corresponds to a piece of equipment that is configured to manage the synchronization status of the other pieces of equipment.

SUMMARY OF THE INVENTION

The invention relates to a method for synchronizing a plurality of pieces of equipment EQi each comprising a clock Hi adjusted to a quartz-crystal oscillator, said pieces of equipment EQi communicating together using a communication protocol, the pieces of equipment being configured to deliver a command signal to a device. The method is characterized in that it comprises at least the following steps for one synchronization cycle:

In each piece of equipment generating the command signal, computing a value of the difference ΔH between a reference-clock value Hm and the local clock Hi of a piece of equipment, by comparing the value of the clock signal at a given time for the equipment to the value of the clock signal for the reference clock, On detecting a phase shift ΔH between the reference-clock value and the value of a local clock,
when the value of the phase shift ΔH between the local clock and the reference clock corresponds to one refresh cycle of the reference clock Hm, a corrected clock time Hic is defined by repeating a number of the clock signal of given parity if the value of the local clock is early and a corrected clock time is defined by skipping one number of the clock signal of opposite parity to the first parity if the local clock value is late,
when the value of the phase shift ΔH is higher than one refresh cycle, the method resets the reference time,
A corrected value of the clock in each piece of equipment is used to emit the command signal.

The even or uneven parity is defined for one synchronization cycle.

According to one variant, the synchronization cycle is repeated with a frequency Fs defined in the following way:

$$F_S = \text{MAX}(|F_{SMIN}|, |F_{SMAX}|)$$

where $$F_{SMAX} = \frac{F_0(1+\varepsilon_1) - F_1(1-\varepsilon_2)}{2}$$

$$F_{SMIN} = \frac{F_0(1-\varepsilon_1) - F_1(1+\varepsilon_2)}{2}$$

$F_S = F_0(\varepsilon_1 + \varepsilon_2)/2$ if the nominal frequency of the oscillators is identical,
if the error of the oscillators is also identical, the refresh period is $Fs = F_0 \times \varepsilon$,
with $F_0$ the frequency corresponding to an equipment emitting the reference clock, $F_1$ the frequency of a slave equipment, and $\varepsilon_0$ and $\varepsilon_1$ the precision of the oscillator.

The method may comprise a calibrating step comprising the following steps:
When an equipment is incorporated into the network, said equipment sends a message $M(EQ_i)$ containing the emission time $T_0$ to all the subscribers of the network,
When the equipment $EQ_i$ that emitted the message again receives the message, it compares the time contained in the message and the local time, and determines the propagation time of a message between itself and an equipment of the system,
The equipment that wants to join the network stores the one or more computed propagation times in order to communicate with the other pieces of equipment (inverters) of the network.

The reference clock Hm is, for example, emitted by an equipment that is initially designated master.

In case of loss of reception of the clock emitted by the master, an equipment having the highest priority in the network adopts the role of master and uses its local clock as reference clock for the other equipments.

According to one embodiment, the emitted command signal is a power delivered by a piece of inverter equipment adapted for delivering energy to a rotating electric machine.

The invention also relates to a system for synchronizing the emission of data between a plurality of equipments communicating together by means of a physical communication link, characterized in that each equipment comprises at least the following elements:

An emitter, a receiver, a counter adapted for counting the local clock signals, a local clock, a memory storing message propagation times, a processor configured for executing the steps of the method according to the invention, One equipment being configured to play the role of master and to deliver a reference clock.

In one application, one equipment is an inverter adapted for delivering energy to a rotating electric machine.

BRIEF DESCRIPTION OF THE DRAWINGS

Other features and advantages of the present invention will become more clearly apparent on reading the description of example embodiments that are given by way of completely nonlimiting illustration, the description making reference to the figures, which show.

DETAILED DESCRIPTION

In order to allow the method according to the invention to be better understood, the following description is given, by way of completely nonlimiting illustration, with respect to the synchronization of a plurality of inverters the function of which is in particular to deliver power (energy) to a rotating electric machine. This description will possibly be adapted by a person skilled in the art to any application outside of the technical field of inverters, provided that there are a plurality of equipments communicating together to be synchronized.

Figure 1:
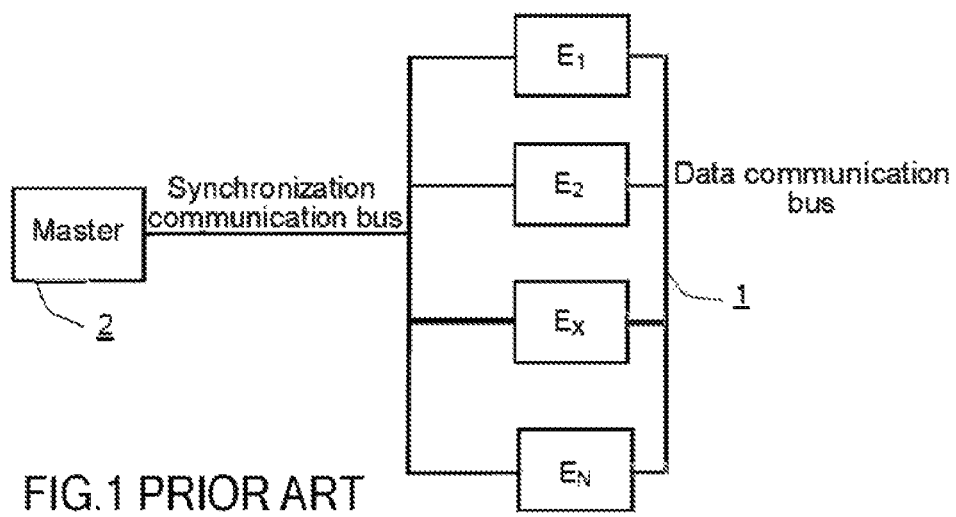
FIG. 1, an example architecture according to the prior art.
Figure 2:
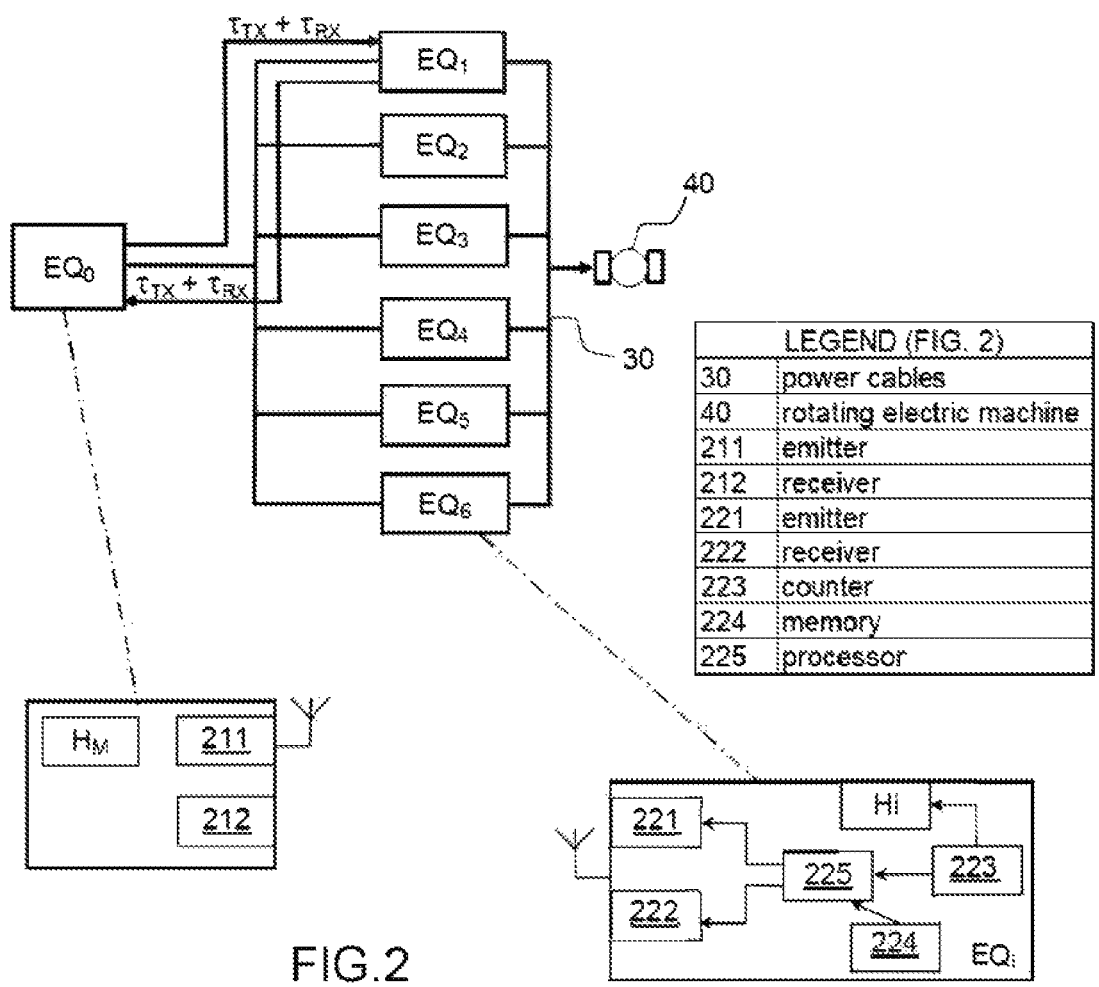
FIG. 2, an example architecture according to the invention and an illustration of the calibrating step, FIG. 3, a representation of the message exchanges between a master equipment and the other elements of the network, and FIG. 4, a schematic of the computation of the correction of clock error carried out in each of equipments of the network.

FIG. 2 illustrates an example architecture comprising a master element having its own clock that communicates with a plurality of inverters.

One equipment, initially designated master $EQ_0$, comprises an emitter 211 and a receiver 212 for communicating with the inverters $EQ_1, EQ_2, \ldots, EQ_5, EQ_6$ of the system. The master equipment operates with its own clock Hm.

An inverter $EQ_1, EQ_2, \ldots, EQ_5, EQ_6$ comprises an emitter 221, a receiver 222, a counter 223 adapted for counting the clock signals as will be detailed with reference to FIG. 4, a specific clock Hi with i=1 to 6 in the given example, a memory 224 adapted for example for storing the propagation times of the messages and other parameters, and a processor 225 configured to execute the steps of the method according to the invention and in particular to decide whether the counter is modified or not.

In the given example, it is assumed that all the inverters of the network know the topology of the network or that they have a means for automatically finding the topology, i.e. the number of inverters present, their technical features, their position in the system and whether they are capable, in a calibrating phase, of computing and storing the propagation time of a message to another inverter of the system in order to be able to communicate with the latter.

The inverters are connected by power cables 30 to a rotating electric machine 40 in order to deliver, to the latter, the energy required for its operation.

In a first example embodiment, one equipment plays the role of master.

The method will comprise, for example, a calibrating phase. When a new equipment wants to form part of the network consisting of one master and of a plurality of slave inverters, the equipment sends a message containing an emission time to all the subscriber equipments (already present) on the network. To do this, the new equipment uses a communication protocol known to those skilled in the art and that will not be detailed.

For example, when the inverter $EQ_1$ is incorporated into the network, the new inverter sends a message $M(EQ_1)$ containing the emission time $T_0$ to all the subscribers of the network. Each equipment, $EQ_i$, with i different from 1, present on the network responds to the inverter $EQ_1$ and copies to its memory the message that it received. The emission time of the message $M(EQ_1)$ emitted by the inverter $EQ_1$ is $T_{TX}$ and the reception time of the message $M(EQ_1)$ by the other inverters $EQ_i$ present on the network is $T_{RX}$. The return delay is equal to $T_{TX}+T_{RX}$.

When the inverter $EQ_1$, emitter of the message $M(EQ_1)$, again receives the message (one message per receiver inverter), it compares the time contained in the received message and the local time given by its clock.

The propagation time $T_P$ of a message is equal to $$\frac{(T1 - T0)}{2} = T_{TX} + T_{RX},$$

with $T_1$ the time contained in the message emitted by an inverter of the system and $T_0$ the time contained in the message initially emitted by the inverter that is seeking to enter into the system. The inverter that is seeking to enter into the system keeps in memory the propagation time computed for each inverter that is connected thereto. This allows it to communicate with these inverters during the operation of the system.

Each inverter may preserve, in its memory, an identification parameter Id of the inverters with which it is liable to communicate, and the computed propagation time of a message.

The system comprises an initializing step, which may take one of two possible forms. Either one equipment has been declared "master", or one equipment will declare itself master depending on a given parameter.

In the case where one inverter has been designated "master", a slave inverter (inverter of the system that does not have the role of master and that is managed by the master inverter) receives the time Hr of the master in an initializing step. Each slave inverter has its own clock Hi, with its own quartz-crystal oscillator, but, as the crystals of the quartz-crystal oscillators are not perfectly identical, the clocks Hi of the inverters have a tendency to desynchronize.

In the case where no equipment has been designated master, the equipment (inverter) having the highest priority will adopt the role of master and will define the time for all the slave inverters taking into account the propagation time of the message computed beforehand in the calibrating phase, for example. The notion of priority corresponds, for example, to the number of the equipment declared within the network, according to principles known to those skilled in the art.

Figure 3:
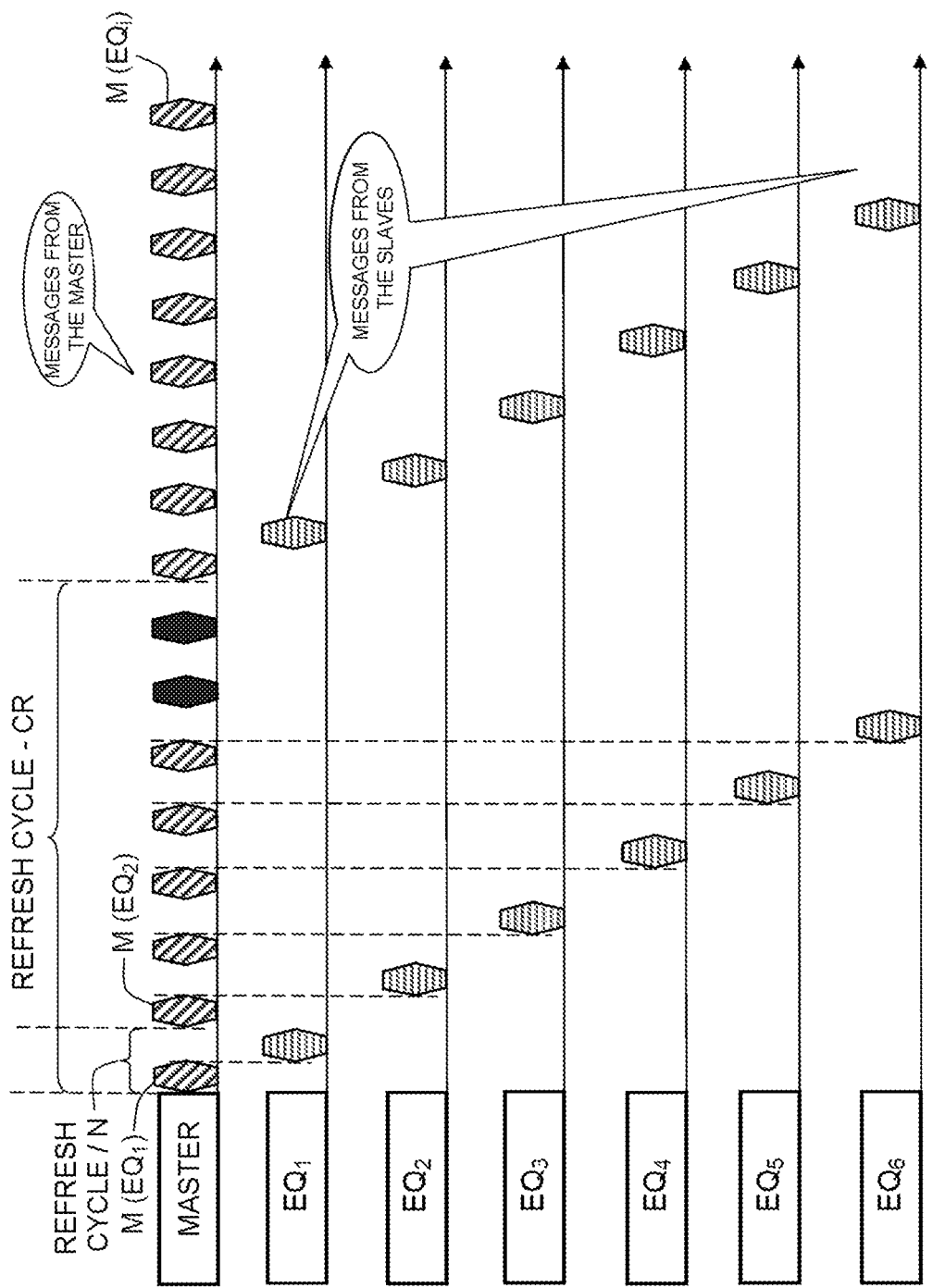

FIG. 3 illustrates an example sequence of the transmission of messages in a sequential system in which the master equipment sequentially transmits a first message M(EQ$_1$) to the first inverter EQ$_1$, a second message M(EQ$_2$) to the inverter EQ$_2$, . . . and so on for the N=6 inverters. The messages M(EQ$_i$) are sent in a refresh cycle C$_R$.

Figure 4:
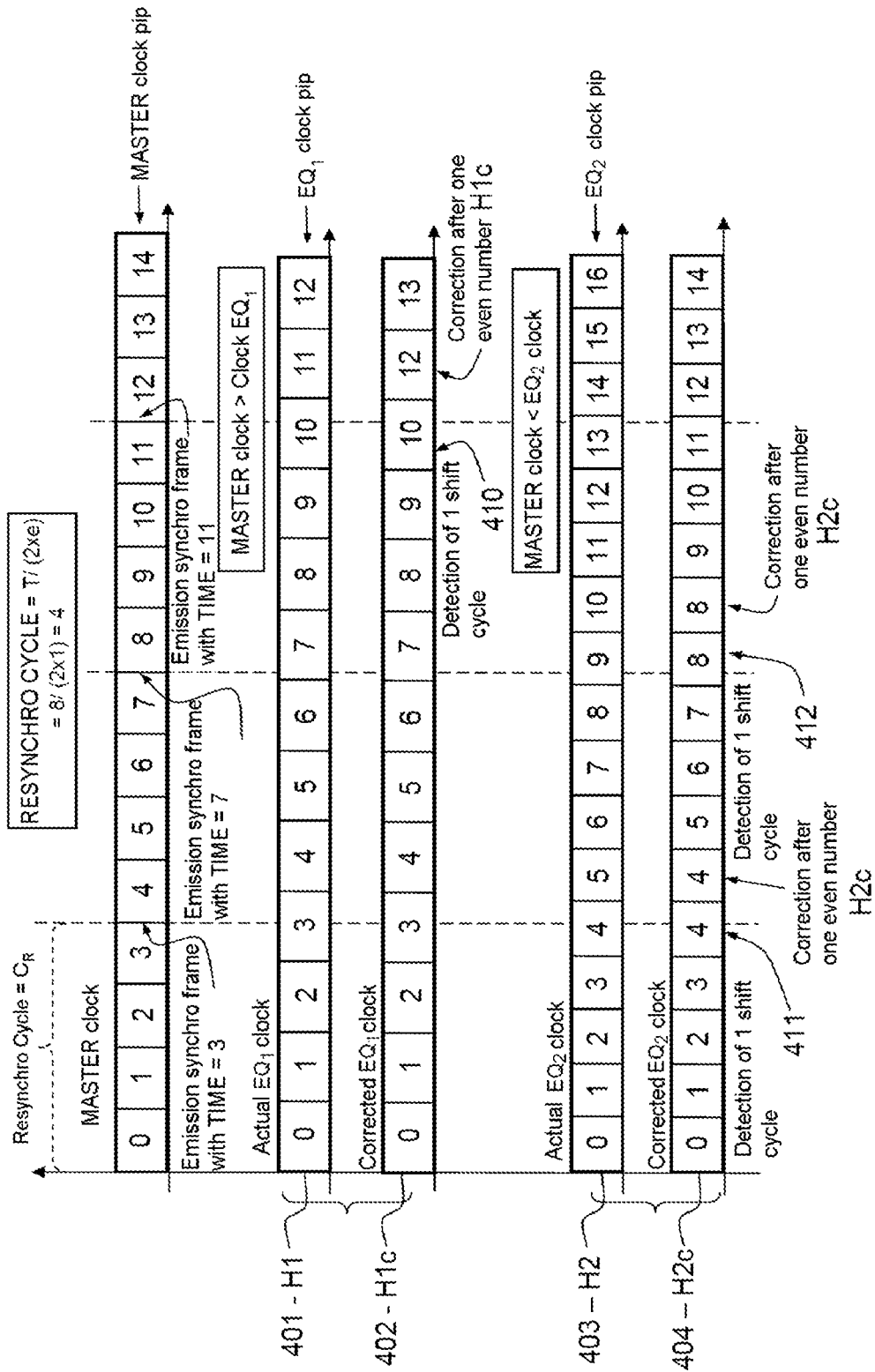

FIG. 4 illustrates the method for computing the correction of a clock carried out in each piece of inverter equipment in order to obtain a synchronization of all of the inverters of the network.

The correcting method according to the invention comprises at least the following steps:
The master inverter emits a synchronization frame at times depending on its clock and in a resynchronization cycle C$_R$, this being shown in FIG. 4 by the row 400.

Each slave inverter (EQ$_1$ and EQ$_2$ in the example) increments its local clock H$_1$, H$_2$, in a synchronization cycle 401, 403. Given that the crystals of the quartz-crystal oscillators of two inverters will not be strictly identical, the clocks of the two inverters have a tendency to desynchronize, The repetition of the synchronization cycle Fs depends on the frequency F$_0$ of the master and the frequency F$_1$ of the slave and on the precision of the quartz-crystal oscillator ($\varepsilon_0$ and $\varepsilon_1$) of the inverters and on the period of the crystal. The synchronization frequency Fs in order to guarantee a clock shift cycle is:

$$F_S = \text{MAX}(|F_{SMIN}|, |F_{SMAX}|)$$

with $$F_{SMAX} = \frac{F_0(1+\varepsilon_1) - F_1(1-\varepsilon_2)}{2}$$

$$F_{SMIN} = \frac{F_0(1-\varepsilon_1) - F_1(1+\varepsilon_2)}{2}$$

$F_S = F_0(\varepsilon_1 + \varepsilon_2)/2$ if the nominal frequency of the oscillators is identical.

If the error of the oscillators is also identical, the refresh period is $Fs = F_0 \times \varepsilon$.

The message M emitted by the master inverter and received by an inverter of the system contains the time H$_M$ of the master plus the propagation time of the master message transmitting its time to the slave inverters EQ$_1$, EQ$_2$. The slave inverter determines the phase shift ΔH between the time received from the master 402, 404 and its local time H given by its local clock Hi, 401, 403.

If the phase shift ΔH measured between the received clock and the local clock of a slave inverter is of one cycle, a correction is made to a number having a chosen (even or uneven) parity, for example an even number; the parity is initially chosen for one synchronization cycle, In the case where the slave inverter is late, the processor indicates to the counter to skip an uneven number (or an even number if the first number is uneven).

For example, in FIG. 4, the local time H$_1$ of the first inverter EQ$_1$ as counted by the counter corresponds to the sequence {0, 1, 2, . . . }. The time received by this inverter EQ$_1$ and contained in the message emitted by the master inverter is {0, 1, 2, . . . 10, 12 . . . }. It may be seen 410 that there is a shift of one cycle between the clock H$_m$ of the master and the local clock H$_1$ of the inverter in the emission of the synchronization frame at the time "11". In this case, the inverter 22 will correct its local clock to the time "11" and replace it H$_{1c}$ with the time "12" in order to reset itself to the master clock. The reset is achieved by comparing the time of the master and the time of the slave. The slave will be shifted by at most one cycle with respect to the master at the end of one synchronization cycle.

If the slave inverter is early, a number of given parity is repeated, the even or uneven parity being initially set, For example, in FIG. 4, the counter detects a shift cycle in the local clock H$_2$ of the inverter EQ$_2$, which is early with respect to the clock received in the message emitted by the master inverter, 403, 404. In this case, the slave inverter EQ$_2$ will reset itself to the master clock by modifying the indicated time H$_{2c}$, 411, "4" instead of "5", 412 "10" with the time "8" indicated in the message from the master;

If the phase shift between the clock of a slave inverter and the clock of a master is larger than one cycle, the time is reset in order to redefine the time. This may occur in the case of loss of messages;

Each clock counter of the slave inverters may have interruptions in the even or uneven numbers depending on the parity initially chosen; the method will define as useful frequency for the slave inverters the value F$_0$/2 (F$_0$ being the nominal frequency of the master).

In the end, once the clock of each slave has been corrected, the method will be able to compute, for example using a modulo operation, the frequency at which an inverter will deliver its power to a rotating electric machine. The clocks having been corrected for each inverter, the powers emitted by each inverter participate in the command of the rotating electric machine and reach said rotating electric machine almost at the same time (±1/F$_0$ jitter).

The slave pieces of inverter equipment have a timeout for detecting the loss of the master equipment. If an equipment receives no message from the master equipment for a period of time TT, it considers communication with the master equipment to have been lost. In this case, it is the equipment having the highest priority that will adopt the master role. This is possible because all the equipments of the network are capable of seeing the frames and messages transmitted over the network.

The synchronizing method according to the invention has the advantage of using any existing communication bus in order not to increase wiring. The loss of an equipment does not lead to loss of the synchronization of the system, and any equipment of the network is capable of taking over while preserving the same synchronization state, the master having been disconnected from the network.

The invention claimed is:

1. A method for synchronizing a plurality of equipments EQi each comprising a clock Hi adjusted to a quartz-crystal oscillator, said equipments EQi communicating together using a communication protocol, the plurality of equipment being configured to deliver a command signal to a device, comprising at least the following steps for one synchronization cycle:

in each equipment generating the command signal, computing a value of the difference ΔH between a reference-clock value Hm and the local clock Hi of an equipment, by comparing the value of the clock signal at a given time for the equipment to the value of the clock signal for the reference clock, on detecting a phase shift ΔH between the reference-clock value and the value of a local clock, when the value of the phase shift ΔH between the local clock and the reference clock corresponds to one refresh cycle of the reference clock Hm, a corrected clock time Hic is defined by repeating a number of the clock signal of given parity if the value of the local clock is early and a corrected clock time is defined by skipping one number of the clock signal of opposite parity to the first parity if the local clock value is late, when the value of the phase shift ΔH is higher than one refresh cycle, resetting the reference time, then using a corrected value of the clock in each equipment to emit the command signal.

2. The synchronizing method as claimed in claim 1, wherein an even or uneven parity that is preserved during one synchronization cycle is defined.

3. The synchronizing method as claimed in claim 1, wherein the synchronization cycle is repeated with a frequency Fs defined in the following way:

$$F_S = \text{MAX}(|F_{SMIN}|, |F_{SMAX}|)$$

where $$F_{SMAX} = \frac{F_0(1+\varepsilon_1) - F_1(1-\varepsilon_2)}{2}$$

$$F_{SMIN} = \frac{F_0(1-\varepsilon_1) - F_1(1+\varepsilon_2)}{2}$$

$F_S = F_0(\varepsilon_1+\varepsilon_2)/2$ if the nominal frequency of the oscillators is identical, if the error of the oscillators is also identical, a refresh period is $Fs = F_0 \times \varepsilon$, with $F_0$ the frequency corresponding to an equipment emitting the reference clock, $F_1$ the frequency of a slave equipment, and $\varepsilon_0$ and $\varepsilon_1$ the precision of the oscillator.

4. The synchronizing method as claimed in claim 1, further comprising a calibrating step comprising the following steps:

when an equipment is incorporated into a network, said equipment sends a message $M(EQ_i)$ containing an emission time $T_0$ to the subscribers of the network, when the equipment $EQ_i$ that emitted the message $M(EQ_i)$ again receives said message, it compares the time contained in said message and the local time and determines a propagation time of said message between itself and said equipment of the system, the equipment that wants to join the network stores the one or more computed propagation times in order to communicate with the other of the plurality of equipments $EQ_i$ (inverters) of the network.

5. The synchronizing method as claimed in claim 1, wherein the reference clock Hm is emitted by one of the plurality of equipments EQi that is initially designated a master.

6. The synchronizing method as claimed in claim 5, wherein, in case of loss of reception of the clock emitted by the master, another of the plurality of equipments EQi having the highest priority in the network adopts the role of master and uses its local clock as reference clock for the other of the plurality of equipments $EQ_i$.

7. The synchronizing method as claimed in claim 1, wherein emitted command signal is a power delivered by a piece of inverter equipment adapted for delivering energy to a rotating electric machine.

8. A system for synchronizing emission of data between a plurality of equipments EQi communicating together by means of a physical communication link, wherein each equipment comprises at least the following elements:

an emitter, a receiver, a counter adapted for counting local clock signals, a local clock, a memory storing message propagation times, a processor configured for executing the steps of the method as claimed in claim 1, one equipment being configured to play a role of master and to deliver a reference clock.

9. The system as claimed in claim 8, wherein one equipment is an inverter adapted for delivering energy to a rotating electric machine.

* * * * *